(12) United States Patent
Huysegems et al.

(10) Patent No.: US 9,509,954 B2
(45) Date of Patent: Nov. 29, 2016

(54) DEVICE FOR IP TV CHANNEL SELECTION

(75) Inventors: Rafaël Huysegems, Walem (BE); Nico Victor Verzijp, Antwerp (BE)

(73) Assignee: Alcatel Lucent, Boulogne-Billancourt (FR)

( * ) Notice: Subject to any disclaimer, the term of this patent is extended or adjusted under 35 U.S.C. 154(b) by 1305 days.

(21) Appl. No.: 12/585,089

(22) Filed: Sep. 3, 2009

(65) Prior Publication Data

US 2010/0077430 A1 Mar. 25, 2010

(30) Foreign Application Priority Data

Sep. 24, 2008 (EP) ..................................... 08290899

(51) Int. Cl.
| | | |
|---|---|---|
| *H04N 7/173* | (2011.01) | |
| *H04N 21/25* | (2011.01) | |
| *H04N 21/2668* | (2011.01) | |
| *H04N 21/466* | (2011.01) | |
| *H04N 21/61* | (2011.01) | |

(52) U.S. Cl.
CPC ........ *H04N 7/17318* (2013.01); *H04N 21/252* (2013.01); *H04N 21/2668* (2013.01); *H04N 21/4661* (2013.01); *H04N 21/6125* (2013.01)

(58) Field of Classification Search
CPC .................. H04N 7/17318; H04N 21/23406; H04N 21/47202; H04N 21/6587; H04N 7/17336
USPC ............................... 725/46, 93–97, 116, 146
See application file for complete search history.

(56) References Cited

U.S. PATENT DOCUMENTS

| | | | |
|---|---|---|---|
| 7,363,646 B2* | 4/2008 | White et al. ..................... | 725/88 |
| 2002/0144267 A1* | 10/2002 | Gutta et al. ...................... | 725/46 |
| 2003/0051240 A1* | 3/2003 | Schaffer et al. ................. | 725/34 |
| 2003/0101451 A1 | 5/2003 | Bentolila et al. | |
| 2004/0255118 A1* | 12/2004 | Shin et al. ...................... | 713/168 |
| 2006/0080360 A1* | 4/2006 | Young et al. .............. | 707/104.1 |
| 2007/0124795 A1* | 5/2007 | McKissick et al. .......... | 725/135 |
| 2007/0136744 A1* | 6/2007 | Simons et al. .................. | 725/34 |
| 2007/0169148 A1 | 7/2007 | Oddo et al. | |
| 2007/0223475 A1* | 9/2007 | De Vleeschauwer et al. .............................. | 370/390 |
| 2008/0005769 A1 | 1/2008 | Sunakawa | |
| 2008/0022320 A1* | 1/2008 | Ver Steeg ....................... | 725/78 |

(Continued)

FOREIGN PATENT DOCUMENTS

| | | |
|---|---|---|
| EP | 1 954 006 | 2/2007 |
| EP | 2071843 | 6/2009 |

(Continued)

OTHER PUBLICATIONS

Japanese Office Action dated Oct. 15, 2013 for related Japanese Application No. 2011-528247 (full translation provided).

(Continued)

*Primary Examiner* — Jason Salce

(74) *Attorney, Agent, or Firm* — Harness, Dickey & Pierce, P.L.C.

(57) ABSTRACT

The present invention is related to a device (1) for assisted channel selection in an IPTV system comprising a selection engine (2) arranged for outputting a channel change command corresponding to a selected channel. The device comprises means for receiving a plurality of channel change requests from a group of users of the IPTV system. The selection engine (2) is arranged for determining the selected channel from a plurality of IPTV channels based on at least one selection criterion derived from at least a part of the plurality of channel change requests of the group of users.

11 Claims, 2 Drawing Sheets

(56) References Cited

U.S. PATENT DOCUMENTS

| | | | |
|---|---|---|---|
| 2008/0117336 A1* | 5/2008 | Gao | 348/731 |
| 2008/0134249 A1* | 6/2008 | Yang et al. | 725/46 |
| 2008/0216135 A1* | 9/2008 | Pfeffer et al. | 725/93 |
| 2008/0229379 A1* | 9/2008 | Akhter | 725/139 |
| 2009/0031342 A1* | 1/2009 | VerSteeg et al. | 725/38 |
| 2009/0049485 A1* | 2/2009 | Agrawal et al. | 725/87 |
| 2009/0165072 A1* | 6/2009 | Wright-Riley | 725/127 |

FOREIGN PATENT DOCUMENTS

| | | |
|---|---|---|
| JP | 2005-160114 A | 6/2005 |
| JP | 2007-208965 A | 8/2007 |
| WO | WO 2005/029859 | 3/2005 |

* cited by examiner

DEVICE FOR IP TV CHANNEL SELECTION

CROSS-REFERENCE TO RELATED APPLICATIONS

This is application claims priority to European Patent Application No. 08290899.7, filed on Sep. 24, 2008, which is hereby incorporated herein by reference in its entirety.

FIELD OF THE INVENTION

The present invention generally relates to the field of Internet Protocol (IP) television and more in particular to a device for channel selection in an IP television system.

BACKGROUND OF THE INVENTION

Devices for channel selection are well known in the art from current Internet protocol television systems, further referred to as IPTV systems, wherein a user is able to manually select a channel from a plurality of IPTV channels. The classical IPTV solution is shown in FIG. 1. The IPTV server infrastructure is basically composed of a multicast part and a fast channel change part. Both parts can be collocated or not. The IPTV client issues a Channel Change Request (CCR) for channel x and receives the channel data (CD) a short time later. The channel selection may be dealt with by just sequentially zapping through each of the channels till a channel is found with content that is interesting for the user. In closed IPTV systems, viewer satisfaction levels are decreasing. As the number of available channels grows, viewers end up in endless zapping loops, looking for better content and still missing the interesting content. On system level the high zapping rates lead to higher bandwidth (BW) requirements for the network and additional BW and processing power in "fast channel change" devices and operations.

At the same time the distribution of video streams is rapidly evolving from multicast to unicast. Content is more and more consumed on demand or delayed in time. Instead of having only a few video flows, consumed by many people and efficiently distributed using multicast techniques, operators are more and more facing video streams that serve only one household or even one single user. This puts an enormous burden on the network in terms of BW requirements.

An improvement in terms of bandwidth requirements was proposed in the reduction of the number of zaps probably obtainable through the use of channel-mosaic that provides a quick overview by combining a number of individual channels with corresponding content into one picture. Using the mosaic, the user can decide with less zaps in comparison to the sequential zapping through the plurality of channels, which channel has his preference. However, the use of channel-mosaic still has disadvantages. A single screen of the mosaic may only contain about 25 channels which renders the solution not scalable with 200 or more IPTV channels. Moreover, its use is not widely adopted under TV-spectators because it offers only a limited added value for the user. The user must stop watching while searching for a better channel. Hence, only a small amount of unnecessary zaps can be prevented through the provisioning of a channel mosaic. The reduction of the zapping-load on the network components is still minor.

Another way to deal with the increasing BW requirements caused by unicast streaming, is adding caching devices and replica servers to the network. These devices replicate and store the content closer to the customer in an attempt to reduce the BW requirements in the network. These techniques all look for a new optimum between the cost of BW and the cost of storage. Since storage cost is decreasing more rapidly than BW cost, this is feasible.

To improve viewer satisfaction and to reduce the need for zap-bound resources, IPTV components such as set top boxes or access nodes can be equipped with a "learning device", with the intention to avoid unnecessary zaps. This solution was proposed in European patent application EP 07291510. This document discloses an Internet protocol TV channel selection device wherein the number of zaps, required for finding content that is interesting for the user, is reduced significantly by using at least one user-related selection criterion (i.e. a user preference) together the information on the various channels extracted from the electronic program guide (EPG). In other words, based on a user-profile and the meta-information on the various channels, the device becomes a personal zapping assistant. In this way the viewer can be triggered when (more) interesting content is currently being broadcasted or becomes available in the Video-on-Demand (VoD) database. To get the preferred content to the user, the IPTV system can create one or more artificial, personal channels, composed of already available broadcast and VoD content. Further, based on the viewer's profile, advertisings can be made more personal and effective because they are based on the profile.

Nevertheless, purely profile based systems have a number of drawbacks. First, they are not able to react on massive channel-zapping of other viewers. The purely profile-based system is unable to trigger the viewer in case there are massive zapping movements in the network towards content that is not 100 matching the user's interest. Example: when the normal programming is interrupted for a news flash on some disaster that has happened, a massive zap movement may take place. People may be calling friends and family to watch. From all channels, viewers are zapping to a same channel. If a pure profile based viewer did not specify news as a preference, he would miss this broadcasting. Secondly, also social aspects are missing. Some examples are It may be that in general, a viewer is not interested in news (i.e; news is not in his profile), except when something is broadcasted that has a link to his life, his family, his friends or the neighbourhood.

If 70% of the family zapped to a travel program, this program is maybe filmed at a location that you actually visited with your family. You probably want to watch the program, even if travel-programs are not your favourite type of content.

If a large percentage of your friends and colleagues zap to a certain movie that is being broadcasted, this film might be interesting to watch, even if the director and actors are missing in your personal profile.

A third disadvantage of purely profile based systems is its static behaviour: a profile system tends to lock the viewer in a limited set of predefined types of content. In that way, the system actually prevents users to discover new, but related types of content. Further there is also the bandwidth problem, as the profile-based system does not offer any solution for the increasing number of unicast flows in the network.

Consequently, there is a strong need for improvement in the field of channel selection devices for IPTV systems.

Aims Of The Invention

The present invention aims to provide an improved device for to channel selection in an IPTV system wherein the above-mentioned problems are avoided or overcome.

SUMMARY

The present invention relates to a device for assisted channel selection in an IPTV system. The device comprises a selection engine arranged for outputting a channel change command corresponding to a selected channel. The device is characterised in that it comprises means for receiving a plurality of channel change requests from a group of users of the IPTV system and in that the selection engine is arranged for determining the selected channel from a plurality of IPTV channels based on at least one selection criterion derived from (at least a part of) the plurality of channel change requests of the group of users.

In a preferred embodiment the selection engine is arranged for determining the selected channel from the plurality of channels based on said at least one selection criterion in combination with meta-information on the plurality of IPTV channels. The device for assisted channel selection may be provided with means for receiving said meta-information.

In another preferred embodiment the selection engine is arranged for determining the selected channel based also on at least one user-related selection criterion. In this way the channel change directions can be further limited to directions that are relevant for the user. The at least one user-related selection criterion is advantageously a set of user preferences of a user of the IPTV system. The channel selection preferably further comprises storage means for storing said set of user preferences.

Storage means is preferably also provided for storing information related to the plurality of channel change requests. Optionally, this storage means is integrated with the storage means for storing the user preferences, such that a single storage means is needed.

The device for assisted channel selection according to the invention further advantageously comprises means for performing an authorisation check on a received channel change request. This can prevent unauthorised users not belonging to the group from influencing the system with their zapping behaviour.

In one embodiment the group of users belong to same access node or to the same edge router. Alternatively, they are actual subscribers to a group of people sharing a same interest or background or so.

Advantageously the channel change command corresponding to the selected channel change is operable in a dedicated channel.

The invention also relates to an access node comprising the device for assisted channel selection as above described.

In another aspect the invention relates to a remote control device for use in an IPTV system. The remote control device is arranged for transmitting to the device for channel selection as previously explained a signal indicating that channel selection is to be based on at least one selection criterion derived from at least a part of a plurality of channel change requests of a group of users.

In an advantageous embodiment the remote control device further comprises means for transmitting to another user of the IPTV system a message related to content of an IPTV channel. In this way viewers can be given the possibility to actively recommend the content they are watching to their groups. This may lead to a more Internet-like form of communities that brings people together with a similar interest.

DETAILED DESCRIPTION OF EMBODIMENT(S)

The present invention proposes to employ for the IPTV channel selection at least one criterion related to a group of users of the IPTV system. More specifically the invention proposes to use the zapping behaviour of a group of IPTV users to assist the individual viewer in making a better choice. Preferably this is done 20 in combination with the use of meta-information on the plurality of available IPTV channels. The meta-information may be extracted e.g. from an electronic program guide (EPG). Preferably, this is further done in combination with at least one user related criterion, e.g. derived from a user profile system. Taking into account the zapping triggers of a group of people allows overcoming the disadvantages of purely profile-based zap assistance systems as set out below.

The device for assisted channel selection according to this invention is based on group induced zapping assistance and uses in an embodiment all or at least a part of the channel change commands that arrive in the same network element (e.g. a DSL Access Multiplexer (DSLAM) or an edge router) as a trigger and selection criteria for its viewers. In this embodiment of the invention the group is formed by subscribers connected to a same network element.

In another embodiment several groups of viewers can be defined. Each group combines a number of viewers that share a certain interest or background. One group of related viewers can be the neighbourhood (e.g. based on the fact that they share the same access node, edge router, . . . as already mentioned). Other groups such as friends, family, colleagues, interest groups, etc. have to rely on subscription. The area of interest that a viewer shares with its groups may be quite different. Neighbours share (breaking) news about some event/accident/ . . . in their local town or village. Friends may share travel programs, soaps, movies, . . . . A family may share health topics and short trips. Colleagues may share company news, sector innovations, fairs and exhibitions. Interest-groups may share hobbies such as photography, cooking, movies, . . . .

Viewers can be given the possibility to actively recommend the content that they are watching to their groups by pressing a button on the remote control. This option can be the start of a more Internet-like form of communities that brings people together with a similar interest.

Figure 1:
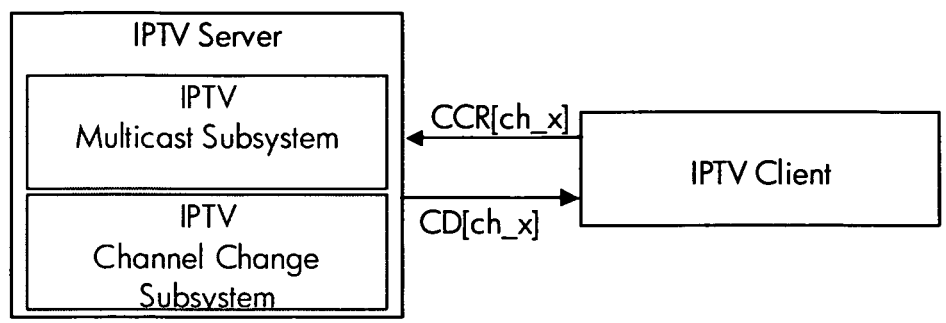
FIG. 1 illustrates the classical IPTV configuration.
Figure 2:
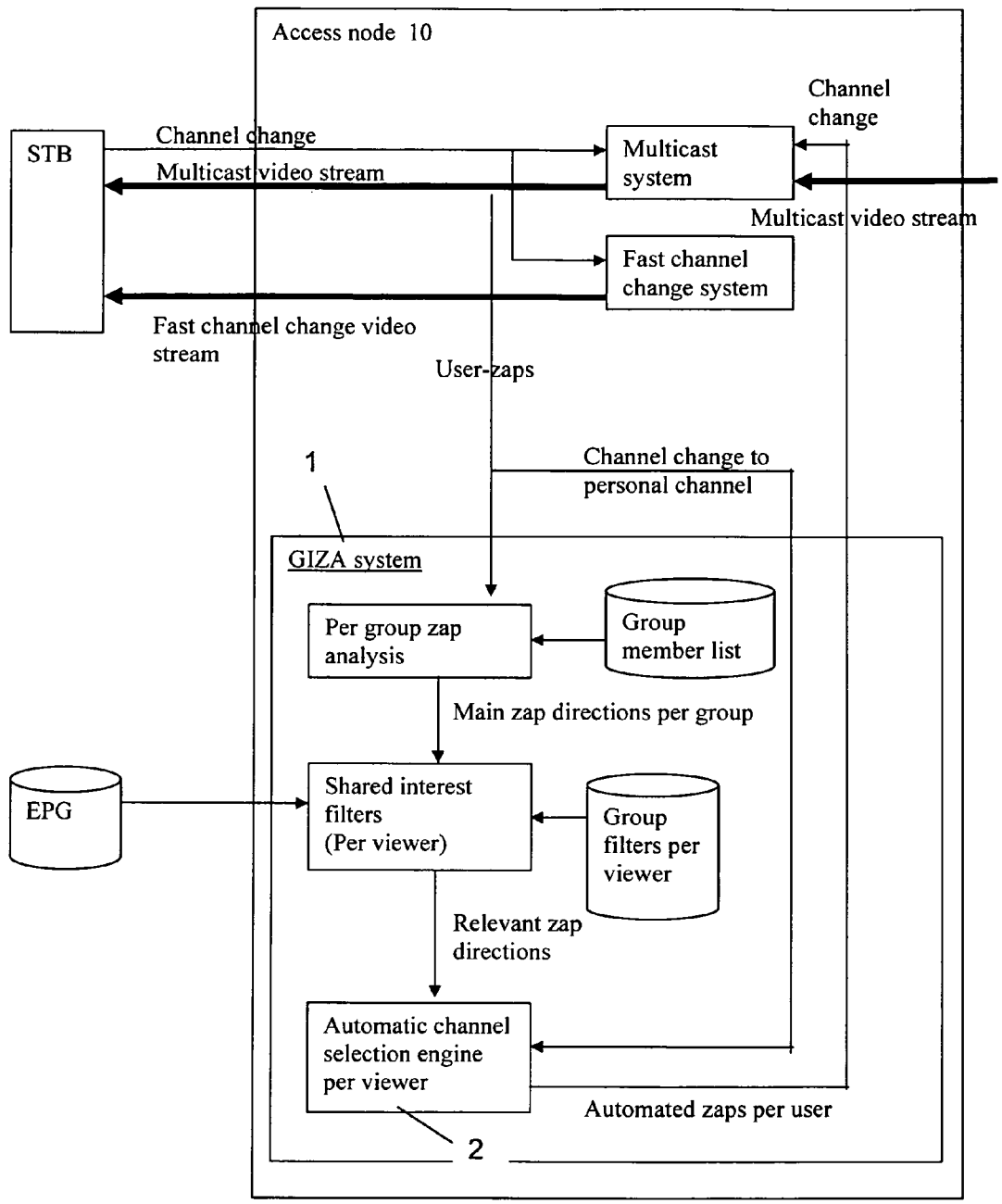
FIG. 2 illustrates a preferred embodiment of the device for channel selection in an IPTV system according to the present invention.

FIG. 2 shows a preferred embodiment of the channel selection device with group-induced zap assistance (GIZA) functionality. The regular IPTV system in the node already contains a multicast part and a fast channel change part, as was already illustrated in FIG. 1. Both parts receive the channel change commands from the set top box (STB).

A GIZA system (1) is added to the node. For the viewer the functionality may appear as an additional channel, e.g. called "my personal channel". If tuned to this channel, the 'zapping assistant' chooses the best matching program according to the ongoing user zaps in your group(s). If not tuned to the personal channel, the generated zap is used as input for the GIZA system, such that the ongoing user zaps per group can be evaluated.

The GIZA system ingests all available zap commands in the node or at least a part thereof. In a first step, individual zap commands are combined into a number of main zap directions per group. Before applying these main zap directions to the automatic channel selection engine per viewer, they must pass via the "shared interest filters", where they are combined with user-specific criteria. For example, when a lot of neighbours of a given user zap to a movie, said given user is not much interested. Only when the neighbours are switching to some news about their village, he is interested. So the purpose of the group-filters per viewer is to limit the main zap directions to zap directions that are relevant for that user. In other words, only the areas of interest shared with the group have an effect on the behaviour of the zap assistant. The group filter overweighs the content shared with the group and underweighs the content different from the group.

In general, the channel selection device with 'group induced zapping assistant' functionality can be implemented as a separate system or as part of an access node. Preferred content can be offered via a dedicated personal TV channel, but can also be recommended to the viewer via a banner or as a PIP or any other suitable means.

A channel selection device based on group induced channel selection has a number of advantages over a purely profile based zapping assistance, both for an operator and for the user.

In common with all zap assistance systems; the reduction of the amount of unnecessary zaps reduces the load on the Instant Channel Change system and the IGMP system. Because the typical video bursts of fast channel change systems can be reduced in quantity, the available bandwidth in the network is used more efficiently. On top of that, zaps performed by a zap assistant do not need fast channel change support at all because they are not triggered by the user. In this case, the system can just wait for the next I-frame (i.e. a frame encoded as a single image without any reference to past or future frames) and show meanwhile the previous stream.

An additional advantage over a pure profile-based assistance is that a mixed GIZA solution, wherein the channel selection is both group induced and profile based, acts as a positive feedback mechanism to popular content. The advantage for the operator is a content watching convergence, i.e. user profiles can be used to make predictions about the popularity of a new movie or other content. The operator can e.g. pre-download certain content at time intervals when the network is not heavily loaded. This allows thus transporting the videostreams in a more efficient way over the network, making better use of techniques such as caching or multicast transport.

Also, the user behaviour becomes more predictable, which facilitates pre-caching techniques that make use of available cache or recording space at the customer premises or in the network.

From the user point of view an advantage is that in common with all zap assistance systems; the zap-time required to find the most interesting content is significantly reduced. The user can be informed about massive channel zapping that takes place in his groups such as neighbours, friends, family, . . . that could indicate interesting content. Interesting content that is applicable to you/your family/your friends/ . . . is not missed because it is not explicitly mentioned in the profile.

The invention breaks the static watching behaviour that is introduced with typical profile based assistance and introduces a social aspect to watching TV. If you get the questions "Did you know that your sports club was at the regional TV yesterday?" the probability is high that you indeed saw it.

Further the invention gives the possibility to users to form real TV communities (grouping people with a similar interest/background) in the same way as on the Internet today where one uses forums, chat communities or dedicated websites (e.g. FlickR, MySpace, Facebook, youTube, . . . ) This could add a different dimension to watching TV, with respect to the leanback character of this medium.

Care should be taken not to disclose the privacy of the group-members when watching TV. This could happen with very small groups. These effects can be avoided by enlarging the groups or by provide the possibility to the user to watch in "stealth" mode. In this mode, the IPTV system does not use that user's zaps as input for the GIZA system to select interesting content for other users.

Although the present invention has been illustrated by reference to specific embodiments, it will be apparent to those skilled in the art that the invention is not limited to the details of the foregoing illustrative embodiments, and that the present invention may be embodied with various changes and modifications without departing from the spirit and scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the spirit and scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", "third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. An assisted channel selection system comprising:
   an internet protocol television (IPTV) server configured to multicast a multicast video stream to a group of users, the multicast video stream including a plurality of IPTV channels and an additional channel, the additional channel carrying one of the IPTV channels;
   a receiver configured to receive a plurality of channel change requests from the group of users of the IPTV system; and
   a selection engine configured to,
      output a channel change command to the IPTV server, the channel change command instructing the IPTV server which one of the plurality of IPTV channels to multicast as the additional channel; and
      determine said additional channel from the plurality of IPTV channels for at least one user of said group of users by filtering the channel change requests from said group of users based on at least one selection criterion of the at least one user, wherein
   the IPTV server is configured to transmit the additional channel to the at least one user, if the at least one user is tuned to the additional channel.

2. The assisted channel section system of claim 1, wherein said selection engine is configured to determine said additional channel from said plurality of channels based on said at least one selection criterion in combination with meta-information on said plurality of IPTV channels.

3. The assisted channel section system of claim 1, wherein said selection engine is configured to determine said additional channel also based on at least one user related selection criterion.

4. The assisted channel section system of claim 3, wherein said at least one user-related selection criterion is a set of user preferences of a user of said IPTV system.

5. The assisted channel section system of claim 4, further comprising:
    first storage configured to store said set of user preferences.

6. The assisted channel section system of claim 5, further comprising:
    second storage configured to store information related to said plurality of channel change requests.

7. The assisted channel section system of claim 6, whereby said second storage is integrated with said first storage.

8. The assisted channel section system of claim 4, further comprising:
    an authorization checker configured to perform an authorization check on at least one of said received channel change requests.

9. The assisted channel section system of claim 1, wherein said group of users belong to a same access node or to a same edge router.

10. The assisted channel section system of claim 1, whereby said additional channel change is operable as a dedicated channel.

11. An access node comprising:
    the assisted channel selection system as in claim 1.

* * * * *